United States Patent [19]
Cooper

[11] 4,151,015
[45] Apr. 24, 1979

[54] FLUX FOR USE IN SOLDERING

[75] Inventor: Robert N. Cooper, Skokie, Ill.

[73] Assignee: Lake Chemical Company, Chicago, Ill.

[21] Appl. No.: 856,672

[22] Filed: Dec. 2, 1977

[51] Int. Cl.$^2$ .......................................... B23K 35/362
[52] U.S. Cl. ........................................ 148/23; 148/25
[58] Field of Search .................................... 148/23-25

[56] References Cited

U.S. PATENT DOCUMENTS

| | | | |
|---|---|---|---|
| 1,949,916 | 3/1934 | McQuaid | 148/25 |
| 2,260,986 | 10/1941 | Coleman | 148/25 |
| 2,522,937 | 9/1950 | Forker | 148/25 |
| 2,700,628 | 1/1955 | DeRosa | 148/25 |
| 3,266,949 | 8/1966 | Groves | 148/25 |
| 3,912,550 | 10/1975 | Bolte | 148/25 |

*Primary Examiner*—P. D. Rosenberg

*Attorney, Agent, or Firm*—Wallenstein, Spangenberg, Hattis & Strampel

[57] ABSTRACT

Water-soluble or readily water-dispersible fluxes for use in connection with soldering operations in plumbing and related or other environments, particularly for use in connection with the soldering of water lines made from copper or copper-base alloys. The said water-soluble or readily water-dispersible fluxes are produced in the form of pastes in which the paste-forming ingredients are water-soluble surfactants or mixtures of surfactants, especially those of nonionic character, with or without water, but especially where water is present in amounts of at least several percent by weight of the finished flux composition, said paste flux compositions also containing water-soluble amine hydrochlorides, and, advantageously, ammonium chloride, with or without various supplemental ingredients which, when used, are employed in small proportions.

12 Claims, No Drawings

FLUX FOR USE IN SOLDERING

My invention relates to novel water-soluble or readily water-dispersible fluxes in paste form and is particularly concerned with such fluxes for use in connection with soft soldering operations in the plumbing and related fields as well as in other environments.

The common soft soldering alloys, such as tin-lead, tin-antimony, and so-called 40/60, 50/50, 60-40 and 95/5 solders are conventionally used for the soft soldering of tin, zinc, nickel, copper, and various of their alloys, with usual soldering fluxes, which comprise zinc chloride, rosin, ammonium chloride, borax, stearin, or mixtures containing the same, the type of flux varying with the nature of the soldering work to be done. In the case of the soldering of such metals, it has also heretofore been known to use certain water-soluble flux compositions but they have certain objections and disadvantages with which those skilled in the art are familiar. Known flux compositions commonly comprise water solutions of zinc chloride or tin chloride, and mixtures thereof, with or without an acid such as hydrochloric acid. Other known flux compositions comprise mixtures of inorganic amine fluorides and inorganic cobalt salts, illustrative of which flux compositions are mixtures of monoethanolamine fluoride (preferably containing an excess of monoethanolamine) and cobaltous hydroxide or cobaltic chloride, with or without supplemental agents such as stannous chloride and manganous chloride. Still other known fluxes, for use in the soldering of stainless steels, which fluxes may be in liquid, solid or paste form, are those which contain a major proportion of orthophosphoric acid, a copper compound such as copper acetate or cupric phosphate, with or without ammonia or organic amines, and with or without surfactants, such as normally liquid, solid, or paste nonionic surfactants exemplified by various of those sold under the trademark PLURONIC (BASF Wyandotte), said PLURONICS, when used, being employed in proportions of the order of about 2 to 25%, particularly 3 to 10%, by weight of orthophosphoric acid, said surfactants being employed to improve the homogeneity of the fluxes and to enhance the wetting and spreading properties of said fluxes during the soldering operation.

In accordance with the present invention, novel fluxes have been developed which are especially useful for soft soldering operations in the plumbing field, particularly for use, but not limited to such use, in the soldering of water lines made from copper or copper-base alloy piping. The fluxes of the present invention are also useful for the soldering of tin, mild steel, terne plate, zinc, nickel, silver, sheet lead and galvanized iron. They should not, however, be used for the soldering of aluminum or stainless steel, nor for the soldering of silver at high temperatures.

Fluxes which are commonly used in the plumbing field, in the soldering of such water lines, generally leave residues in the lines which, it has been found, subsequently cause problems due to the fact that such residues, over a period of time, tend to support bacterial and/or fungal growths, commonly of the character of yeasts, coliforms, Pseudomonas, and the like. The fluxes of the present invention not only are effective to perform their intended function as soft soldering fluxes but, in addition and importantly, the residues which result from their use, being water-soluble or readily water-dispersible are easily and simply washed out of the water lines by the passage of water therethrough after the soldering operation has been completed, and the possibility for bacterial and fungal growths subsequently occurring is eliminated. For convenience, the term "water-soluble" is used hereafter and in the claims to cover fluxes which are water-soluble or readily water-dispersible so that they can easily be washed out of water lines as indicated above.

The fluxes of the present invention are in the form of pastes and they contain, as essential ingredients, one or more water-soluble surfactants in paste form or which in admixture form a paste with or without water, said surfactant or surfactants constituting the basis for the paste form of the fluxes, a water-soluble amine hydrohalide (i.e., a hydrochloric, hydrobromic or hydrofluoric acid salt of an amine, which salt is water-soluble), and, most desirably, also, ammonium chloride. The paste-forming water-soluble surfactant or surfactants, including such water as may be used, which commonly will range from about 10 or 20 to about 40%, most advantageously constitutes the major ingredient or ingredients, by weight, of the flux compositions, and may comprise as much as about 95%, but, more commonly, will range from about 40 to 90%, usually about 40 to 60%. The water-soluble amine hydrohalide, most desirably hydrochloride, is generally utilized in proportions in the range of about 2 to 30%, better still about 5 to about 20%, by weight, of the flux compositions, but, in certain instances, can be much greater, indeed as much as about 60 to 80% although such is not preferred. In those cases where ammonium chloride is utilized in the flux compositions, which is particularly preferred, the proportions thereof are also variable, ranging generally from about 1% to about 15%, and most desirably from about 2 to 6%, by weight, of the flux compositions, but the proportions thereof are not critical. The flux compositions may, and advantageously do, include minor proportions of supplemental ingredients, generally in the range up to about 1%, by weight, of the flux compositions. Illustrative thereof is butylated hydroxy toluene which tends to prevent darkening in the color of the flux compositions on standing or in storage.

The water-soluble surfactant or surfactants which provide the paste form of the finished flux compositions, or which, in admixture with water, provide the paste form of the finished flux compositions of the present invention can be those of water-soluble anionic or nonionic character or mixtures of both of said types of surfactants. Such surfactants are, per se, well known to the art.

Those of the anionic type or character are, commonly, long chain alkyl sulfates: long chain alkyl aryl sulfonates such branched chain alkyl (polypropylene) benzene sulfonates and long chain linear alkyl benzene sulfonates; long chain aliphatic olefin sulfonates; long chain fatty acid monoglyceride sulfates; long chain alkyl sulfoacetates; long chain alkyl sulfosuccinates; and long chain alkyl phosphates, although many more are well known. Illustrative of such anionic surfactants are the water-soluble salts, commonly the sodium or ammonium salts, of: mixed coconut oil alcohol (predominately lauryl alcohol) sulfates; $C_{12}$ to $C_{15}$ branched chain alkyl benzene sulfonates; $C_{12}$ to $C_{15}$ linear alkyl benzene sulfonates; $C_{12}$ to $C_{16}$ α-olefin sulfonates; $C_{12}$ to $C_{14}$ monoglyceride sulfates; $C_{12}$ to $C_{14}$ alkyl sulfoacetates; dioctyl sulfosuccinate; $C_{12}$ to $C_{14}$ alkyl phosphates; and tridecyl alcohol phosphates. Various of the foregoing surfactants are commercially sold under such designations as PLURAFACS and IGEPALS.

Those of the nonionic type or character are, commonly, water-soluble ethylene oxide adducts or ethylene oxide — propylene oxide adducts, and they include ethylene oxide adducts such as $C_9$ to $C_{18}$ alkyl phenol ethoxylates, $C_8$ to $C_{18}$ linear and branched chain alcohol ethoxylates; polyethylene glycols containing from 12 to 20 oxyethylene groups; ethoxylated higher fatty acid amides; ethoxylated $C_{10}$ to $C_{15}$ linear primary aliphatic alcohols; higher alkylphenoxy (ethyleneoxy) ethanols; and polyoxyalkylene compounds, particularly as exemplified by the aforementioned PLURONICS. The said PLURONICS are nonionic surfactant polyols, prepared by the sequential addition to a propylene glycol base of propylene oxide followed by ethylene oxide (as shown, for instance, in U.S. Pat. Nos. 2,674,619 and 2,677,700); and by the sequential addition to an ethylene glycol base of ethylene oxide followed by propylene oxide (as shown by U.S. Pat. No. 3,036,118), this latter group being designated as PLURONIC R polyols. The PLURONICS are produced in various average molecular weights, generally in the range of about 1,200 to 9,000, and are in the form of normally liquids, pastes or solids at room temperatures. It is preferred to use the water-soluble nonionic surfactants in the flux compositions of the present invention, and especially the PLURONICS or those of like character commercially sold under other trade designations by various manufacturers. Illustrative of said PLURONICS are those sold under the trade designations P-84; L101; F98; 10 R 8 which is a solid having a molecular weight of about 5,000; 25 R 5 which is a paste and in which the active material has a molecular weight of about 4500; 25 R 9 which is a solid having a molecular weight of about 9,000; 31 R 1 which is a liquid having a molecular weight of about 3,200; 31 R 2 which is a liquid having a molecular weight of about 3,400; and 31 R 4 which is a paste and in which the active material has a molecular weight of about 4,300. The aforesaid physical forms of the foregoing identified PLURONICS are those at room temperatures. Where those PLURONICS or other water-soluble surfactants are employed which are liquids or solids at room temperatures, they, or the flux compositions containing the same, are converted into paste form by, for instance, admixing with another water-soluble surfactant of the nonionic or anionic type in the form of a liquid or a solid to produce a paste, or with water, as the case may be, to form a paste so that the final flux composition is in paste form.

The amines whose hydrohalides are used in the flux compositions of my invention are water-soluble and dissolve in the water in those instances in which water is included as one of the ingredients of the flux compositions, which will be the case in the particularly advantageous embodiments of my invention. The amines themselves, of which the hydrohalides are utilized in the flux compositions of the present invention, can be selected from a large group illustrative of which are aliphatic (including cycloaliphatic) amines, including aliphatic hydroxy amines, such as ethylamine, propylamine, isopropylamine, diisopropylamine, butylamines, amylamines, hexylamines, cyclohexylamine, octylamines, and nonylamines; alkanolamines and alkylalkanolamines, exemplary of which are monoethanolamine, diethanolamine, triethanolamine, propanolamine, isopropanolamines; morpholines, pyridine, α-Picoline, piperazine, butanolamines, 2-Amino-2-methyl-1-propanol, 2-Amino-2-methyl-1,3-propanediol, 2-Amino-1-butanol, ethylaminoethanol, diethylaminoethanol, diisopropylaminoethanols, dibutylaminoethanol, 1-Dimethylamino-2-propanol, ethyldiethanolamine, butylaminoethanol, isopropylethanolamine, butyldiethanolamine, N'-Isopropyl-2-methyl-1,2-propanediamine, N'-(2-Hydroxyethyl)-2-methyl-1,2-propanediamine, ethylenediamine, diethylenetriamine, triethylenetetramine, hexamethylenetetramine, propylenediamine, and the like, and mixtures of two or more of such amines, including commercial mixtures of two or more of various of said amines. Exceptionally satisfactory for use in the flux compositions of the present invention is monoethanolamine hydrochloride, advantageously with sufficient added or excess monoethanolamine to provide for an essentially neutral monoethanolamine hydrochloride product, or with a slight excess thereover of added or free monoethanolamine, for instance, about a 5 to 10% excess.

The following examples are illustrative of fluxes made in accordance with my invention. It will, of course, be appreciated that said examples are not in any way to be construed as limitative since numerous other examples can readily be evolved in light of the guiding principles and teachings set forth herein. All parts listed are by weight percent.

EXAMPLE 1

| | |
| --- | --- |
| PLURONIC 25 R 8[1] | 36.08 |
| PLURONIC 31 R 2[2] | 18.87 |
| Monoethanolamine hydrochloride | 6.5 |
| Ammonium chloride | 4 |
| Monoethanolamine | 0.6 |
| BHT | 0.2 |
| Water | 33.75 |

[1] Normally solid; average molecular weight 9,000; melting point 56° C.
[2] Normally liquid; average molecular weight 3,400; Brookfield Viscosity 25° C., 818 cps.

EXAMPLE 2

| | |
| --- | --- |
| PLURONIC 25 R 8 | 35 |
| PLURONIC 31 R | 18 |
| Monoethanolamine hydrochloride | 6 |
| Ammonium chloride | 4 |
| Monoethanolamine | 0.5 |
| Water | 36.5 |

EXAMPLE 3

| | |
| --- | --- |
| PLURONIC 25 R 8 | 36 |
| PLURONIC 31 R | 19 |
| Monoethanolamine hydrofluoride | 6 |
| Monoethanolamine | 0.5 |
| Water | 38.5 |

EXAMPLE 4

| | |
| --- | --- |
| PLURONIC 25 R 5 | 80 |
| Monoethanolamine hydrochloride | 6 |
| Ammonium chloride | 4 |
| Monoethanolamine | 0.5 |
| BHT | 0.3 |
| Water | 9.2 |

EXAMPLE 5

| | |
| --- | --- |
| PLURONIC 25 R 5 | 50 |
| Lauryl sodium sulfate | 10 |
| Monoethanolamine hydrochloride | 6.5 |
| Ammonium chloride | 4 |
| Monoethanolamine | 0.5 |
| Water | 29 |

EXAMPLE 6

| | |
| --- | --- |
| Coconut oil alcohol ammonium sulfates (paste) | 75 |
| Monoethanolamine hydrochloride | 6 |

EXAMPLE 6-continued

| | |
|---|---|
| Ammonium chloride | 3 |
| Monoethanolamine | 0.5 |
| Water | 15.5 |

EXAMPLE 7

| | |
|---|---|
| PLURONIC 25 R 8 | 36.08 |
| PLURONIC 31 R 2 | 50.36 |
| Monoethanolamine hydrochloride | 6.5 |
| Ammonium chloride | 4 |
| Monoethanolamine | 0.6 |
| BHT | 0.2 |
| Water | 3 |

The flux composition of Example 1 represents the best embodiment of which I am presently aware of the fluxes of the present invention.

Conventional soldering techniques and conventional soldering temperatures are used with the improved fluxes of the present invention, said fluxes being employed in the same general manner in which heretofore known fluxes have been used in the soldering of copper or copper-base alloy tubes and piping in the plumbing and related industries. This involves, for instance, first removing any soil, scale or grit from the area where the solder is to bond, spreading the paste flux on the surface to be soldered, assembling the parts, then heating and soldering in conventional manner, and after the solder is set, removing the flux residues by wiping externally with a damp cloth or, in the case of pipes, thoroughly flushing the inside of the pipe with water.

What is claimed is:

1. A water-soluble paste-form soldering flux composition having particular utility for the soldering of copper and copper-base alloy water lines, said flux composition consisting essentially of at least one surfactant selected from the class consisting of nonionic surfactants of the class of water-soluble ethylene oxide adducts and ethylene oxide-propylene oxide adducts and anionic water-soluble surfactants, said surfactants as such or in admixture in the flux composition being in the form of a paste, and a water-soluble organic amine hydrohalide in which the hydrohalide is selected from the group consisting of hydrochlorides, hydrobromides and hydrofluorides, said organic amine hydrohalide being present in a proportion of from about 2 to 80 weight % of said flux composition.

2. A flux composition according to claim 1, in which the proportions of the organic amine hydrohalide are from about 5 to about 20 weight %.

3. A flux composition according to claim 1, in which the hydrohalide is hydrochloride.

4. A flux composition according to claim 1, in which the organic amine hydrohalide is monoethanolamine hydrochloride.

5. A flux composition according to claim 1, which also includes from about 1 to about 15 weight % of ammonium chloride.

6. A flux composition according to claim 1, which contains water in an amount in the range of about 10 to about 40 weight %.

7. A flux composition according to claim 1, in which the organic amine hydrohalide is monoethanolamine hydrochloride and which is present in proportions of about 5 to about 20 weight %, and in which said flux also includes from about 2 to about 6 weight % of ammonium chloride.

8. A flux composition according to claim 3, in which an excess of monoethanolamine is present over stoichiometric proportions and sufficient to at least neutralize the monoethanolamine hydrochloride.

9. A water-soluble paste-form flux composition having particular utility for the soldering of copper and copper-base alloy water lines, said flux composition containing the following ingredients in substantially the following proportions by weight %:

At least one water-soluble surfactant selected from the class consisting of (a) propylene oxide-ethylene oxide adducts of a propylene glycol base, and (b) ethylene oxide-propylene oxide adducts of an ethylene glycol base, said surfactant being in the

| | |
|---|---|
| form of a paste | 40-90 |
| An aliphatic hydroxy amine hydrochloride | 5-20 |
| Ammonium chloride | 2-6 |
| Water | 10-40 |

10. A flux composition according to claim 8, in which the aliphatic hydroxy amine is monoethanolamine.

11. A flux composition according to claim 9, in which the stated ingredients are present in substantially the following proportions by weight %:

| | |
|---|---|
| Said paste-form surfactant | 40-60 |
| Monoethanolamine hydrochloride | 5-20 |
| Ammonium chloride | 2-6 |
| Water | 20-40 |

12. A flux composition according to claim 1, in which the surfactant is an anionic surfactant selected from the class consisting of sulfonates, sulfates, sulfoacetates, sulfosuccinates and phosphates.

* * * * *